United States Patent [19]

Pryor

[11] Patent Number: 4,574,199

[45] Date of Patent: Mar. 4, 1986

[54] SENSING LOCATION OF AN OBJECT

[75] Inventor: Timothy R. Pryor, Tecumseh, Canada

[73] Assignee: Diffracto Ltd., Windsor, Canada

[21] Appl. No.: 461,685

[22] Filed: Jan. 27, 1983

[51] Int. Cl.$^4$ .............................................. G01N 21/86
[52] U.S. Cl. ...................................... 250/561; 33/503
[58] Field of Search .......... 33/174 L, 125 A, DIG. 3, 33/366; 250/560, 561, 202, 231 R, 227, 578, 216, 222.1; 356/1

[56] References Cited

U.S. PATENT DOCUMENTS

| | | | |
|---|---|---|---|
| 4,089,608 | 5/1978 | Hoadley | 356/1 |
| 4,364,178 | 12/1982 | Huet | 33/174 L |
| 4,427,880 | 1/1984 | Kanade et al. | 250/222.1 |
| 4,451,988 | 6/1984 | McMurtry | 33/174 L |

Primary Examiner—David C. Nelms
Assistant Examiner—J. Jon Brophy
Attorney, Agent, or Firm—Larson and Taylor

[57] ABSTRACT

An apparatus and method for sensing the presence or location of an object in a plane perpendicular to a reference axis is disclosed. An optical detector using triangulation techniques is used to sense the presence or rough location of the object. A contact detector is then used to determine the precise location of the object. The presence or location of the object can also be detected in a plane including the reference axis. The probe device containing the two detectors is preferably moved quickly while the rough location is determined and more slowly to determine the precise location. The contact detector can be an optical contact probe moved by an auxiliary moving device attached to a main moving device. Various optical contact detectors are also disclosed.

38 Claims, 6 Drawing Figures

SENSING LOCATION OF AN OBJECT

FIELD OF THE INVENTION

The present invention relates generally to the sensing of the position of an object, and more particularly to the quick and precise sensing of the position of an object using optical sensing devices.

BACKGROUND OF THE INVENTION

Various coordinate measuring machines are known in the prior art and typically utilize a mechanical probe known as the Renishaw probe. However, these known probes are expensive, slow (because they must slowly contact the surface or part being sensed), prone to breakage (because they must contact the part being sensed), and inaccurate in certain applications.

In general, the problem with respect to a coordinate measuring machine is to move the mechanical arm, the encoded coordinates of which are used to perform the measurement, and to move the probe into a position such that it can register against some feature of the part being sensed. Typical of the features being sensed are four walls, a face flange, etc. To this end, a considerable number of probes have been used heretofore, with one example being typified by that shown in U.S. Pat. No. 4,177,568. However, the standard probe in the industry for measuring coordinates remains the Renishaw probe.

Therefore, there exists a need for a coordinate measuring means which overcomes the disadvantages present in previous coordinate measuring machines. In another U.S. patent application by the present inventor, Ser. No. 207,081 filed Nov. 14, 1980, a number of probe devices to solve these problems are also disclosed.

SUMMARY OF THE INVENTION

In accordance with the present invention, an apparatus and method are disclosed for sensing the presence or location of an object in a plane perpendicular to a reference axis or in a plane perpendicular to a reference plane. An optical detector using triangulation techniques senses the presence or rough location of the object. A contact detector then is moved to contact the object in order to determine the precise location of the object. In one embodiment of the present invention, the optical detector projects a light beam along the longitudinal axis of a probe shaft in which the contact detector is mounted. Conveniently, a laser light source is used for the optical detector and this laser light source is remotely located from the contact detector. In addition, a position detector which is part of the optical detector is also remotely located from the contact detector.

In one embodiment of the present invention, the contact detector uses an optical contact probe. The optical contact probe has a light beam whose transmission is interrupted when the probe contacts the object. In this embodiment, an auxiliary moving device is used to move the optical contact probe separately from the moving device used to move the optical detector and the optical contact detector as a unit. This auxiliary movement can be an oscillation along the axis or in the plane of measurement.

In another embodiment of the present invention, the optical contact probe includes one or more contact bars extending away from the center of the probe. One end of the bar contacts the object and the other end is positioned to interrupt a light beam. The contact bars are resiliently mounted and are moved appropriately away from the center of the optical contact probe periodically. This movement can be simultaneous or sequential. Preferably, this movement is accomplished by pneumatically operated devices.

Where desired, the optical detector can project a plurality of spots on the object. A suitable detection unit can then detect the relative movements of these spots to determine the attitude of the object. The detection unit is conveniently a matrix array detector and by providing auxiliary illumination for the surface of the object, the surface of the object can additionally be scanned for holes or the like.

It is an object of the present invention to provide a coordinate measuring machine probe which allows the sensor probe to search for the surface of interest at high rates. In addition, it is a further object of the present invention to measure the position of the surface precisely.

It is a feature of the present invention that the sensor probe is initially moved at a high rate to a location adjacent the surface of interest, and that the sensor probe can then be moved at a slow rate to precisely locate the surface of interest.

Other features and advantages of the present invention are stated in or are apparent from a detailed description of presently preferred embodiments of the invention found hereinbelow.

DESCRIPTION OF THE PREFERRED EMBODIMENTS

As mentioned above, applicant's prior U.S. patent application Ser. No. 207,081 discloses a number of optical contact detector devices which can be utilized to precisely measure the position of an object. The devices disclosed in this previous application are adaptable for use with the invention disclosed herein, and this prior application is hereby incorporated by reference.

Figure 1:
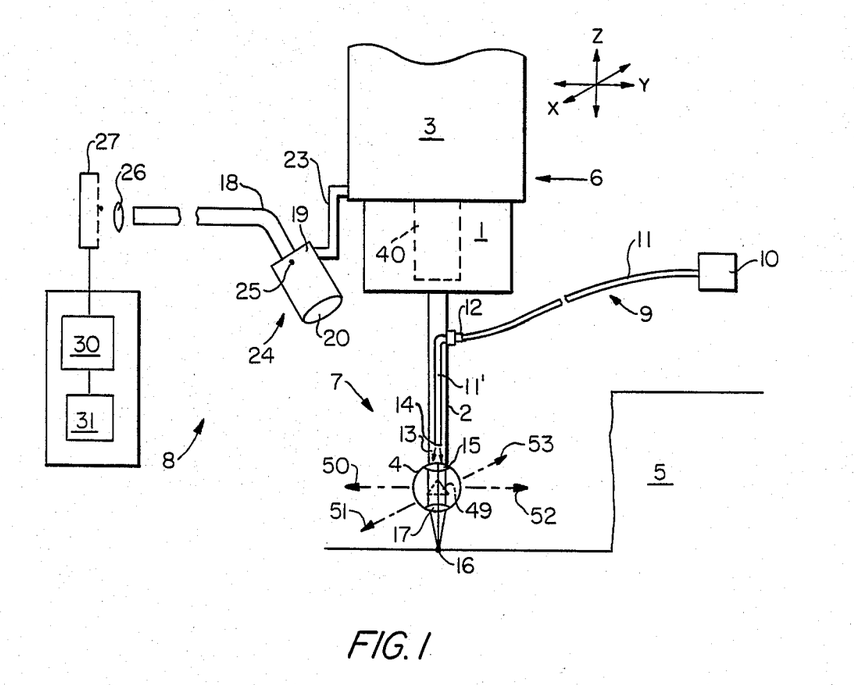
FIG. 1 is a schematic representation of a front elevational view of a device for sensing the presence or location of an object according to the present invention.

With reference now to the drawings in which like numerals represent like elements, a presently preferred embodiment of a sensing device 6 according to the present invention is depicted in FIG. 1. Sensing device 6 includes a conventional contact probe 7 of the touch trigger (RENISHAW) or contouring (ZEISS) type. Contact probe 7 includes an electronic portion 1 and a probe shaft 2 attached thereto. Electronic portion 1 is also connected to a coordinate measuring machine 3 which is capable of moving in three axis of motion and precisely monitoring the exact movements thereof. A ball 4 is located at the distal end of probe shaft 2 and includes a switch or the like which sends a signal to electronic portion 1 whenever ball 4 is deflected upon contact with object 5. As mentioned above, although contact probe 7 utilizes electronic principles to sense contact with object 5, optical principles such as disclosed in applicant's prior application can also be used.

Sensing device 6 also includes an optical detector 8 consisting of a light source 9 and a sensor unit 24. As shown, light source 9 includes a diode laser 10 which projects a light beam through fiber 11 to a coupling 12 located on probe shaft 2. Probe shaft 2 is specially adapted to include a fiber 11' located along the longitudinal center thereof having an end 14 adjacent ball 4. Light 13 emitted from end 14 is focused by a lens 15 onto the surface of object 5 to form a spot 16. Ball 4 is provided with a window 17 which allows light 13 to pass therethrough.

Sensor unit 24 is used to monitor the position of spot 16 on the surface of object 5. Sensor unit 24 includes a housing 19 which is attached to coordinate measuring machine 3 by an arm 23. Located at one end of housing 19 is a lens 20 which causes an image 25 of spot 16 to be focused on one end of a fiber optic 18. Image 25 is remotely monitored by focusing the other end of fiber optic 18, which is preferably a coherent fiber bundle, with a lens 26 onto a suitable spot position detector or photo diode array 27. A suitable spot position detector is a UDT SC-10 analog type and a suitable photodiode array is a RETICON 256C photodiode array. An electronic circuit 30 is then used to find the centroid of the spot and this data is fed to a microcomputer 31.

It should be appreciated that it would be possible to locate detector array 27 directly at the position where image 25 is formed rather than remoting it over fiber optics. In addition, diode laser 10 could be located in probe shaft 2 rather than remoted via fiber optics as well. However, the use of fiber optics allows photodiode array 27 and laser 10 to be remotely located thereby reducing the size and weight which must be supported by coordinate measuring machine 3.

It should also be appreciated that additional light beams such as 50, 51, 52, and 53 could be projected along the X and Y axes from ball 4 by using a pyramid shaped reflector 49 (shown in dotted lines). In such a case, additional camera units 40 (one is shown in dotted lines) located 90° apart around electronic portion 1 could be utilized to monitor the spots produced by beams 50, 51, 52, and 53. Such a sensing device would be capable of monitoring the presence or location of object 5 in all three axes.

In operation, sensing device 6 functions in the following manner. Initially, using optical detector 8, the surface of object 5 of interest is monitored using the triangulation principle. The triangulation principle is disclosed in greater detail in U.S. patent application Ser. No. 34,278, filed Apr. 4, 1979, by the inventor of the present application and others and is herein incorporated by reference. Basically, the triangulation principle is that the position of image 25' on photodiode array 27 is a direct function of the distance of spot 16 from ball 4. Therefore, any change in the position of image 25' is directly proportional to the change in distance between spot 16 and ball 4. Therefore, if it is only desired to determine the rough position of the surface of object 5, coordinate measuring machine 3 is appropriately moved to a position where spot 16 is imaged onto photodiode array 27. In many situations, the resolution of photodiode array 27 is sufficient and it is unnecessary to actually touch the surface of object 5 to measure its position.

Where the exact position of the surface of object 5 is to be determined, contact probe 7 is used in addition to optical detector 8. In most situations, contact probe 7 has a much higher resolution than optical detector 8 using triangulation principles. This is particularly true where a large standoff is provided between lens 15 and the place where spot 16 is formed. If contact probe 7 were used alone, the finding of the exact position of the surface of object 5 would be a slow and tedious procedure as coordinate measuring machine 3 would have to move in a fairly slow and deliberate manner. However, by providing obtical detector 8 which does not require contact with the surface of object 5, coordinate measuring machine 3 can be moved fairly rapidly until it is determined that ball 4 is approaching the surface of object 5. This is determined when spot 16 first appears as image 25' on photodiode array 27. Once optical detector 8 indicates that the surface of part 5 is near to ball 4, feedback signals provided by microcomputer 31 slow the relative rate of approach of ball 4 and the surface of part 5. Coordinate measuring machine 3 then slowly moves ball 4 into a fine contact with the surface of part 5 without smashing ball 4 and this provides a precise locating of the surface of object 5. This method provides a high rapid rate contact measurement which is not possible with a contact probe alone.

Figure 2:
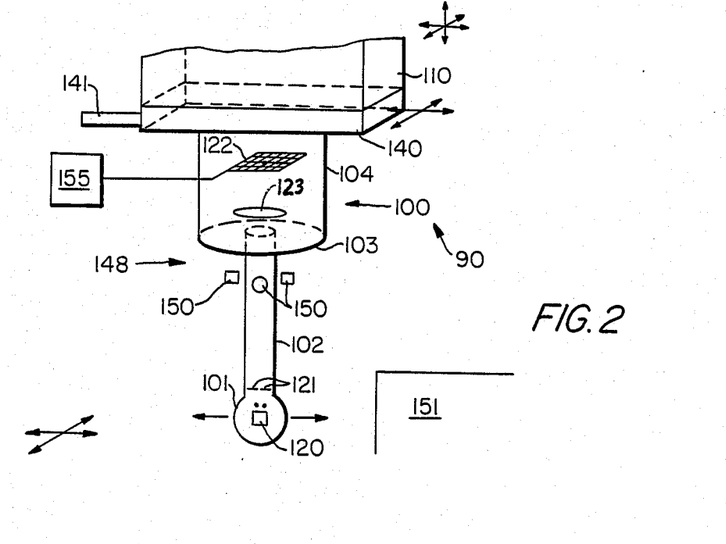
FIG. 2 is a schematic representation of an elevational perspective view of an alternative embodiment of a device for sensing the presence of or location of an object according to the present invention.

Depicted in FIG. 2 is an alternative embodiment of a sensing device 90 with a contact probe 100 and with the optical detector, similar to optical detector 8 described above, omitted for clarity. In this embodiment, contact probe 100 includes a ball 101 on the end of a probe shaft 102. The other end of probe shaft 102 is attached to a diaphram 103 connected to a housing 104. Housing 104 is in turn attached to a coordinate measuring machine 110 which is capable of moving in the three Cartesian axes. For example, coordinate measuring machine 110 could be attached to a robot.

In this embodiment, a light emitting diode 120 or other light source is located in ball 100 and illuminates a hole or aperture having edges 121 located in probe shaft 102. The image of edges 121 are imaged onto a matrix photodetector array 122, such as GE2200, by a lens 123. Diaphram 103 is slotted or transparent so that light can pass through diaphram 103 to lens 123. Photodetector array 122 picks up the edge images and is scanned to determine the position of ball 101 and the two axes (XY) shown.

It should be noted that contact probe 100 can be moved in the XY plane independent of the movement of coordinate measuring machine 110. This movement is provided an auxiliary moving means 140. Auxiliary moving means 140 is designed to move only a small distance, for example, 1 to 2 centimenters, and this movement is accomplished via suitable motor drives 141 shown. Auxiliary moving means 140 allows contact probe 100 to move at a much higher rate, due to much less mass, than coordinate measuring machine 110 moves.

Instead of, or in addition to, auxiliary moving means 140, an oscillating moving means 148 can also be provided with contact probe 100. Oscillation is conveniently accomplished using magnetic or piezo-electric devices such as from coil or drivers 150. Drivers 150 are capable of providing a known deflection to sweep ball 101 in either an X or Y direction, or in any other motion in the XY plane.

In operation, optical contact probe 100 of sensing device 90 functions in the following manner to sense the location of the surface of object 151. Initially, as with sensing device 6, the optical detector is used to position contact probe 100 adjacent to the surface of object 151. Once this occurs, auxiliary moving means 140 is used to move ball 101 into contact with the surface of object 151. When this occurs, the projected image of edges 121 move on photodetector array 122 and this movement is sensed by computer 155 to indicate that the surface of object 151 has been located. It should be noted the auxiliary moving means 140 is capable of moving ball 101 faster than if coordinate measuring machine 110 were used. Auxiliary moving means 140 need only move the relatively small mass of contact probe 100 whereas coordinate measuring machine 110 is fairly massive. The precise direction of the surface of object 151 need not be known, as auxiliary moving means 140 can move fairly rapidly in the XY plane to find the surface.

Where oscillating moving means 148 is used, ball 101 is again located adjacent the surface of object 151 and drivers 150 are actuated. When ball 101 contacts the surface of object 151, the image of edges 121 on photodetector array 122 is located at a position which is measured by computer 155 to determine the exact location of the surface of object 151. Again, it is not necessary to know in what direction the surface of object 151 lies, as this can be determined once contact is made. It should also be noted that oscillating moving means 148 moves ball 101 fairly rapidly so that contact is quickly made and the position of the surface of object 151 is quickly determined.

Figure 3:
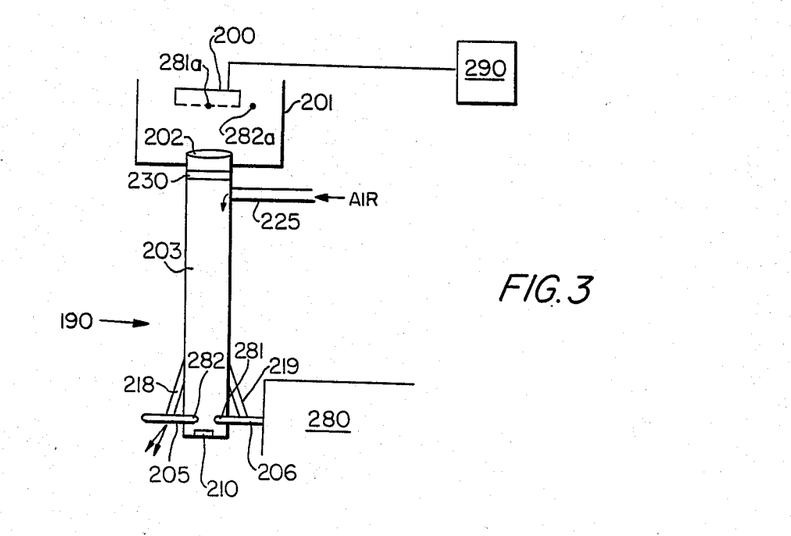
FIG. 3 is a schematic representation of a front elevational view of an alternative embodiment of an optical contact detector.

Depicted in FIG. 3 is an alternative embodiment of an optical contact probe 190 which is part of a sensing device (not shown). Optical contact probe 190 includes a photodetector array 200 located in a housing 201. Extending from housing 201 is a probe shaft 203. Located at the distal end of probe shaft 203 are contact bars 205 and 206 having inner edges 282 and 281, respectively. Located below contact bars 205 and 206 is an LED light source 210. Light source 210 illuminates inner edges 281 and 282 so that the images 281a and 282a, respectively, of these edges are formed on photodetector array 200 by lens 202. Contact bars 205 and 206 are mounted to probe shaft 203 on cantilevered leaf springs 218 and 218, respectivey. An air pressure inlet 225 is provided into the interior of probe shaft 203. A window 230 prevents the air pressure from going back up toward photodetector array 200. The air pressure introduced into probe shaft 203 causes contact bars 205 and 206 to be forced outwardly. Contact bars 205 and 206 can be pushed outward either simultaneously, or sequentially as desired.

In operation, optical contact probe 190 functions in a manner similar to optical contact probe 100 described above. Initially, optical contact probe 190 is positioned adjacent the surface of object 280 whose position is to be measured. Air source 225 is then actuated to force contact bar 206 into contact with the surface of object 280. When contact occurs, image 281a of inner edge 281 appears on photodiode array 200 at a position somewhat different from the unactuated position. On the other hand, image 282a of inner edge 282 is located beyond photodiode array 200 because contact bar 205 did not contact a surface. Thus, because image 281a is on photodetector array 200, this indicates that contact bar 206 has contacted the surface of object 280 and the displacement of image 281a from the null position is fed into computer 290 so that the precise position of the surface of object 280 is determined. It should be noted that it is not necessary for image 282a to go off of photodetector array 200 in order to determine whether contact has been made, as it would be sufficient to have image 282a merely go beyond a known point to indicate that no contact had ocurred.

It should be appreciated that air source 225 acts as an auxiliary moving means to move contact bars 205 and 206. It should also be appreciated that 4, 6, or even 8 contact bars could be provided at equally spaced intervals around the center axis of probe shaft 203. It is comtemplated that the acutation of the contact bars would occur several times a second.

Besides precisely measuring the location of the surface of object 280, it is also possible to use optical contact probe 190 to precisely determine the diameter of bores or the like. In such a situation, both contact bars 205 and 206 would be forced outwardly until the walls of the bore were contacted. The diameter could then be determined by the separation between the two images 281a and 282a of the inner edges 281 and 282 of contact bars 205 and 206. Obviously, it would not be necessary to position optical contact probe 190 in the center of the bore, so long as contact bars 205 and 206 have sufficient movement to contact the inner walls of the bore.

Figure 4:
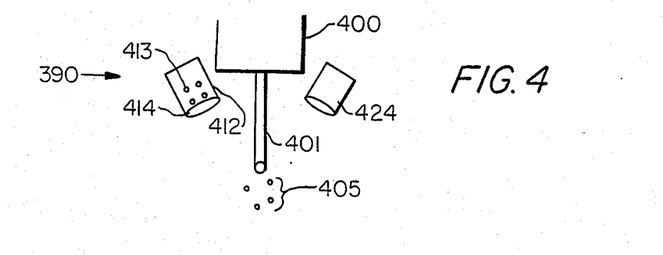
FIG. 4 is a schematic representation of a front elevational view of a device for sensing the presence, location, and attitude of the surface of an object according to the present invention.

Depicted in FIG. 4 is a sensing device 390 having a contact probe 400 of the type such as those described above. Contact probe 400 includes a probe end 401. Located around contact probe 400 is a triagulation projection unit 412 which includes a cluster of four diode lasers 413. The light beams produced by diode lasers 413 are focused by lens 414 into four spots 405. If desired, diode lasers 413 can be remotely located by use of fiber optics. A camera unit 424, similar to sensor unit 24 described above with respect to FIG. 1, is used to detect the image position of spots 405. As was described in U.S. application Ser. No. 34,278, mentioned above, the detection of the relative positions of spots 405 allow for the attitude (in pitch and yaw) as well as the range of the surface of an object to be determined. Basically, triagulation techniques are again used to determine these dimensions with the relative positions of spots 405 determining the contour of the surface and the triangualtion techniques used to determine the location of the surface. With sensing device 390, both the location and attitude of the surface of the object can be precisely determined.

Figure 5:
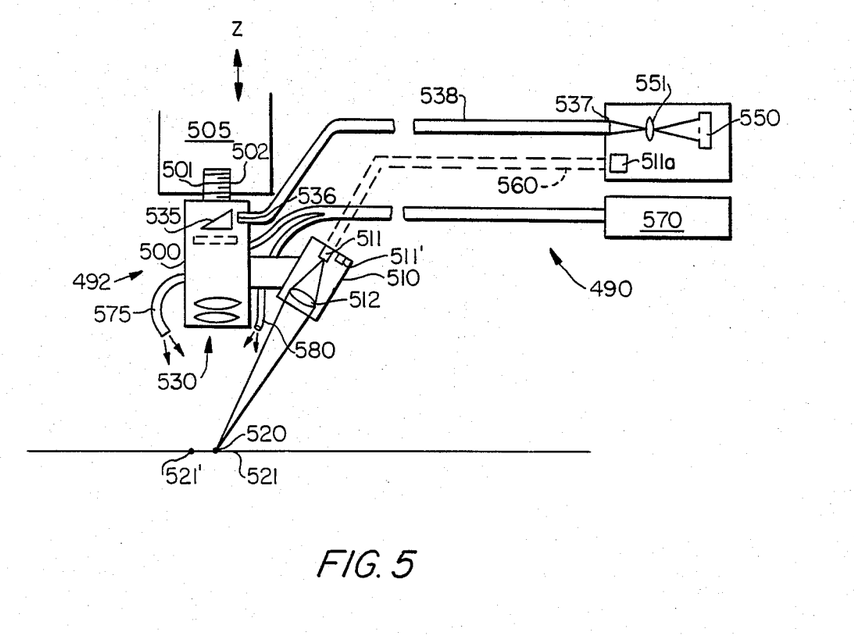
FIGS. 5 and 6 are schematic representations of a front elevational view of alternative embodiments of an optical detector according to the present invention.

Depicted in FIG. 5 is a sensing device 490 containing a simple triangulation probe 492 which is designed to fit into existing Renishaw type probe mounts. Triangulation probe 492 includes a barrel shaped housing 500 which is typically 3-5 centimeters long and 1 centimeter in diameter. Housing 500 includes a post 501 (with or without threads 502) with which housing 500 is attached to a coordinate measuring machine 505 which in this case moves in the Z axis.

Attached to housing 500 is a light source unit 510 containing a diode laser 511 and a lens 512 which projects a spot or line zone 520 onto a surface 521. Lens system 530 located in housing 500 forms an image of zone 520 onto coherent fiber bundle end 536 by use of a prism 535. This image is conducted by coherent fiber bundle 538 to the opposite end 537 from which an image of the zone 520 is then formed on spot position detector 550 by a lens 551.

It should be noted that laser 511 could be ultimately replaced by a laser 511a located remotely from triangulation probe 492 adjacent spot position detector 550. The laser light could be conducted to lens 512 by an optical fiber 560. In such an embodiment, a visible gas laser or other light source could be used which would otherwise be too big to place adjacent probe 492.

Sensing device 490 is also provided with a remote source 570 of white light illumination. Source 570 is also remotely located from probe 492 adjacent spot position detector 550. Light from source 570 is conducted by fibers 575 and 580 to illuminate surface 521.

In operation, sensing device 490 functions in the following manner. Using simple triangulation techniques, spot 520 is imaged on spot position detector 550 and the distance of triangulation probe 492 from surface 521 is easily determined. If desired, an additional diode laser 511' which projects a spot 521' can also be provided. In this case, where two spots are projected the angle of surface 521 with respect to triangulation probe 492 can also be determined by measuring the relative displacement between spot 520 and spot 521'. As discussed above, with respect to FIG. 4, if four spots are projected even further information can be determined so long as a matrix array or area analog detector is used in place of spot position detector 550.

Where an area array is used for spot position detector 550, this area array can also image the area around spot 520 by use of illumination from source 570 which is conducted through fibers 575 and 580. In this case, hole edges and the like can be found which exist on surface 521.

While the present invention has been described with respect to exemplary embodiments thereof, it will be understood by those of ordinary skill in the art that these and other variations and modifications can be effected within the scope and spirit of the invention.

Figure 6:
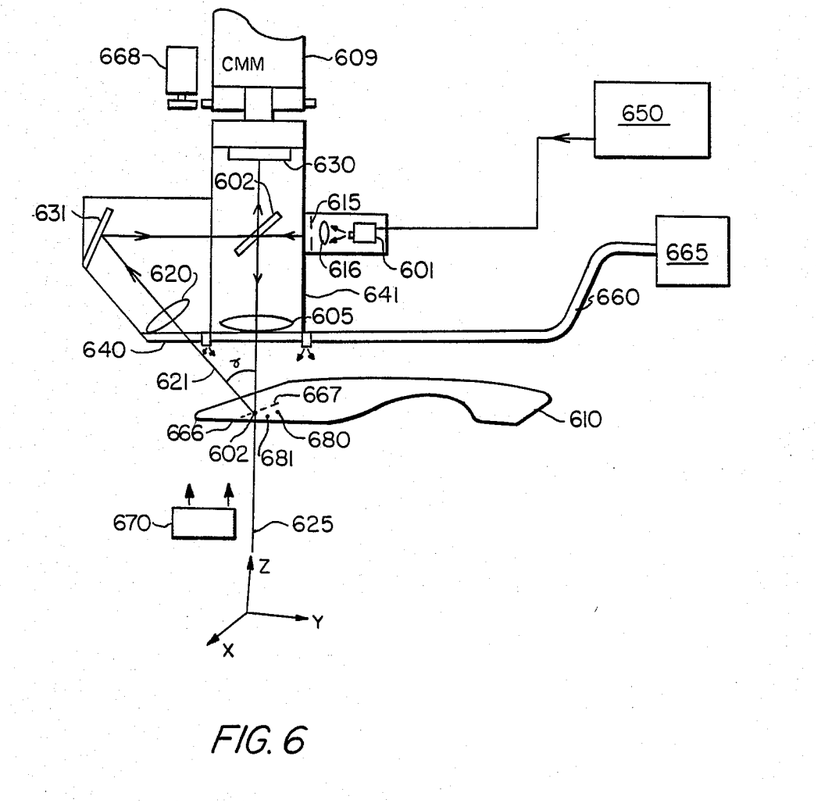

An additional embodiment of the invention is shown in FIG. 6. Unlike the embodiment of FIG. 5, this unit projects the light from a direction normal to the axis of the machine, which is generally desirable. Light from diode laser 601 (which, as in FIG. 5, can be optionally fiber optically remoted) is diverted by mirror 602 which is dielectrically coated to reflect essentially 100% of the light at the diode laser (or other triangualation source) wavelength but pass other of the wavelengths in the spectrum. A gas laser can also be used to provide a visible beam, however this general requires fiber optics to remote the laser in order to have a small light probe suitable for mounting on the gimbaled wrist 60 g or other portion of a CMM machine. A typical wrist is the two gimballed Renishaw PH9. Even better are continuously indexible wrists.

The light diverging from the diode laser is collected by objective lens 605 and focussed to a spot 606 on a part 607, such as fender panel 610. An aperture, such as 615 placed in the optical system between the diode laser and the beam splitter can be used to further define the zone focussed to be a spot, a line, a grid, or whatever as desired. Generally, spots are used. Further an additional lens such as 616 can be utilized at the diode laser to more further collect the light shown in dotted lines. This allows objective 605 to focus the spot at closer distance to the sensor which could be desirable for increased resolution.

In addition, triangulation sensing is accomplished according to the invention by having a separate lens 620 whose axis 621 is spaced in angle $\alpha$ to axis 625 of lens 605. Lens 620 collects the light reflected from spot 602 and images it on to matrix array 630 by way of mirror (or prism) 631 and mirror 602. Alternately a separate array could be used in place of mirror 631. In addition matrix array 630 can be remotely located by using a bundle or if possible, a waveguide single fiber. These are not available now but they may be in the future.

A window 640 is also desirable on housing 641. As the part moves to or from along the axis of projection 625, the spot 602 then moves on the array and this array is itself connected to a microcomputer readout 650. A suitable matrix array is a GE TN 2200.

The reason for using the matrix whereas only a linear array would be required for the above measurement, is that imaging of the edges (or other features of the part surface) in two axes, x and y, can also be accomplished. In this case "white" light or light at other wave lengths than the laser wave length of laser 601 is used for surface illumination. This is shown using fiber bundle 660 from remote white light source 665 to illuminate the part. This illumination can be turned on and off as necessary to allow a clear view of the diode laser spot. Alternatively, the diode laser can be turned on and off to provide a bright spot in the center of the white light field or in the range only case a spot alone. All these modes can operate. It is noted that to get good contrast with the diode laser spot is not necessary in general to turn the white light completely off, only down. Also a bank of easily switchable LEDS or diode lasers at different wavelengths than laser 601 can easily be used instead of the white light. Also a xenon flash can be used instead of a CW lamp with the flash duration desirably controlled to obtain an optimum reflected light intensity.

As can be seen, lens 605 also acts as the objective lens for surface image in white light collecting the light reflected by the surface and imaging it back to the matrix array. The diode laser spot image, however, does not come to the matrix array via this path because of the 100% mirror, at the diode laser wavelength. This makes a compact sensor.

Finally, it is noted that an alternative mode of operation can be used which, however, has considerably less resolution and that is to utilize a partial mirror (beam splitter) instead of mirror 602, and simply use the focusing and defocusing of the spot to indicate the position of the part. That is, part location is determined when the spot is best focused (i.e. nominal z axis range) or the width of the spot is monitored and the growth in imaged spot size is related to out of focus distance from nominal z position. This approach makes lens 629 and mirror 631 unnecessary, but is not in general accurate enough for most measurement and further has a dichotomy since at, or near, the focal point one does not know where one is, in other words, forward or backward from the focus. However, since one wants to be more or less centered in the nominal range of the sensor around the focus of the white light, one can cause the spot to always be sensed in this area on one side of its focus at the diode laser wavelength.

By use of a separate sensor channel comprised of lens 620 and mirror 631 one can tailor the spot (range) resolution to be different than that of the "white" light surface, used to determine for example locations such as edge 666 of fender 610. This is generally desirable since it is usually desirable to have the white light image cover a larger range than the range image. However, this is not necessarily true. In a practical example used for automotive panel measurement, the xy range was 18 mm, the z axis range of 10 mm.

Further of interest is the use of light section projection 667 as shown in dotted lines, achieved by changing the optics in front of diode laser 610. This can provide multiple contour points light section fashion when imaged by lens 620 on to matrix array 630. This can be very useful near edges of body panel parts, such as panel 610 to determine the curvature of the edge, and thereby the eventual point of tangency of the edge (which is not always visible in surface illumination).

When using light sections, it is often desirable to have a rotation means such as motor 668 as shown to allow the sensor line and view direction to be in any direction desired about the z axis. A typical example is to "point" the line normal to an edge of a part. Rotation is controlled by the sensor micro computer or coordinate machine computer.

Rotation can also be useful in the appartus of FIG. 5, rotating about the axis of post 501. For example if a linear array sensor 550 is used it is often desirable to rotate such that the scan of said of array is normal to part edges in the field.

It is also noted that the panel edge 666 can be back illuminated too, as with lamp 670 built into the panel holding fixture (not shown for clarity). This can give better edge location data. Also front illumination with reflecting tape etc. located behind the edge on the fixture can also be used.

Microcomputer 650 can include readout circuitry to determine edge or spot locations such as shown in co-pending applications by the inventor and his co-workers (circuits, turbine). Using same, accuracies of 0.01-0.02 mm are achieveable in the x, y and z directions of the sensor in FIG. 6.

It is desirable in general to take sensor data as fast as possible, so that measurements can be achieved "on-the-fly" while the sensor is being moved by the machine, without "blur" error. Operation of a linear array in these sensors at 1000 scans/second or greater is for example desirable, for both edge and triangulation data.

However, even this speed is often not sufficient and in any case, what about matrix arrays generating at far slower scan rates? (e.g. 30/sec)? The solution, where possible is to pulse the light source(s) with a burst of sufficient intensity to be detectable, in as short a time period as possible, in order to "freeze" the motion and eliminate blur.

In low cost miniature probes as disclosed herein, delivery of sufficient light in a short time period is often difficult. Accordingly, a control rationale is now disclosed to mitigate the difficulty.

A host computer controlling the machine x y z axes (and possibly one or more sensor rotational axes) desireably sends a "read" signal to the sensor control, while at the samd time recording the individual axes locations and possibly slowing down the axes motion slew rates. The sensor light source then illuminates the part with as much energy as possible, and when a sufficient amount has been reflected in order to make the measurement, the sensor communicates back a "finish read" signal to the host which then locks up the final axes positions.

In the computer, the start and finish axes positions are noted, together with the sensed edge or range data from the sensor scanned out from the array(s). A mean axes location is then computed which corresponds, in the simplest case to the mid time point of the sensor data input, and these values combined with the sensor data, which is assumed to be entered on the mid point (assuming axes rates and reflectivity are uniform during the integration time of the array during the scan).

The sensor of FIG. 6 can include a plurality of projected light beams as previously discussed relative to FIG. 5 to provide attitude information about the surface of the object. Such means can be generated by using multiple lasers or a single laser with a divider to create a plurality of beams. Another example is to project a line, such as 667 combined with an additional spot such as 680. This is sufficient, with added processing of the warp of the line, to get attitude in both planes plus range along all the points along the line. Alternatively, one can project two parallel lines, or a line such as 667 and two spots e.g. 680 and 681. The latter is perhaps best for fast accurate surface data in a small zone, plus the advantage of a line of light section derived contour data points.

It is further noted that non-laser light sources can be used for triangulation, but are much less preferable.

The control steps above also in general apply to the optical contact sensor of FIGS. 1-3, if a pulsed light soruce is not used.

I claim:

1. An apparatus for sensing the presence or location of an object in a plane perpendicular to a reference axis comprising:
    optical detector means for optically detecting by use of optical triangulation techniques the presence or approximate location of the object in the plane perpendicular to the reference axis;
    contact detector means for contacting the object in the plane perpendicular to the reference axis and for determining the precise location of the object; and
    moving means for moving said optical detector means and said contact detector means relative to the object along the reference axis.

2. An apparatus for sensing presence or location as claimed in claim 1 wherein said contact detector means includes a contact probe means for generating a signal when the object is contacted thereby and a coordinate measuring means for moving said contact probe means relative to the object and for precisely monitoring the position of said contact probe means when said contact probe means contacts the object.

3. An apparatus for sensing presence or location as claimed in claim 2 wherein said contact detector means further includes a probe shaft having a longitudinal axis and on one end of which said contact probe means is attached and which is attached at the other end to said coordinate measuring means, and wherein said optical detector means includes a light beam projected along the longitudinal axis of said probe shaft and out of said probe means.

4. An apparatus for sensing presence or location as claimed in claim 3 wherein said optical detector means further includes a laser light source, a lens for focusing the laser light emitted from said probe means onto the object surface to form a spot, and a position detector means for detecting the location of the spot and hence the distance of the spot from said probe means.

5. An apparatus for sensing presence or location as claimed in claim 4 wherein said laser light source is remotely located from said contact detector means and a fiber optic conducts the laser light beam from said light source to said probe shaft, and wherein said position detector means is also remotely located from said contact detector means.

6. An apparatus for sensing presence or location as claimed in claims 1 or 4 wherein said optical detector means further includes a projecting means for projecting at least one additional light beam perpendicular to the reference axis and at least one additional sensor unit and position detector means for determing the location of the spot produced on the object by said additional light beam, and wherein said moving means moves along an additional axis perpendicular to the reference axis.

7. An apparatus for sensing presence or location as claimed in claim 6 wherein four additional light beams are projected which are 90° from adjacent light beams and wherein four additional sensor units and position detector means determine the location of the four spots produced.

8. An apparatus for sensing presence or location as claimed in claim 2 wherein said contact detector means is an optical contact probe means having a light beam whose transmission is interrupted so as to generate a signal when said optical contact probe means contacts the object.

9. An apparatus for sensing presence or location as claimed in claim 8 wherein said optical contact probe means also detects the object in a reference plane which includes the reference axis.

10. An apparatus for sensing presence or location as claimed in claim 9 and further including an auxiliary moving means for moving said optical probe means in the reference plane, said auxiliary moving means also being moved by said first moving means.

11. An apparatus for sensing presence or location as claimed in claim 10 wherein said auxiliary moving means moves said optical contact probe means in an oscillatory motion in the reference plane.

12. An apparatus for sensing presence or location as claimed in claim 10 wherein said optical contact probe means includes a contact bar having one end extending away from said optical contact probe means and the other end positioned to interrupt said light beam, and wherein said auxiliary moving means includes a resilient mounting means for mounting said contact bar for movement in the reference plane and an actuating means for periodically moving said contact bar in the reference plane.

13. An apparatus for sensing presence or location as claimed in claim 12 wherein there are a plurality of resiliently mounted contact bars equally spaced in the reference plane about said light beam and wherein said actuating means moves said plurality of contact bars simultaneously.

14. An apparatus for sensing presence or location as claimed in claim 12 wherein there are a plurality of resiliently mounted contact bars equally spaced in the reference plane about said light beam and wherein said actuating means moves said plurality of contact bars sequentially.

15. An apparatus for sensing presence or location as claimed in claims 13 or 14 wherein said actuating means is pneumatically operated.

16. An apparatus for sensing presence or location as claimed in claim 2 wherein said optical detector means includes a projection unit for projecting a plurality of spots on the object and a detection unit for further detecting the relative movements of said spots to thereby determine the attitude of the object.

17. An apparatus for sensing presence or location as claimed in claim 16 wherein there are four projected spots.

18. An apparatus for sensing presence or location as claimed in claims 1, 4, 9 or 16 wherein said optical detector means includes a matrix array detector, and further including an auxiliary illumination means for illuminating the surface of the object and an imaging means for imaging the illuminated surface of the object on said matrix array detector.

19. An apparatus for sensing presence or location as claimed in claim 18 wherein said illuminating means includes a source of illumination remotely located from said contact detector means and said imaging means includes a fiber optic to conduct the image of the illuminated surface to said array detector.

20. An apparatus for sensing presence or location as claimed in claim 19 wherein said contact detector means further includes a probe shaft having a longitudinal axis and on one end of which said contact probe means is attached and which is attached at the other end to said coordinate measuring means, and wherein said optical detector means includes a light beam source means for projecting a spot of light beyond the one end of said contact probe and onto the surface of the object and a collection means located in said probe shaft for collecting light and forming a spot image from light reflected from the spot along the direction of the longitudinal axis of said probe shaft.

21. An apparatus for sensing presence or location as claimed in claim 2 wherein said contact detector means further includes a probe shaft having a longitudinal axis and on one end of which said contact probe means is attached and which is attached at the other end to said coordinate measuring means, and wherein said optical detector means includes a light beam source means for projecting a spot of light beyond the one end of said contact probe and onto the surface of the object and a collection means located in said probe shaft for collecting light and forming a spot image from light reflected from the spot along the direction of the longitudinal axis of said probe shaft.

22. A device for optically sensing the presence or location of an object in a place perpendicular to a reference axis, conprising:
an optical contact detector means for detecting the presence of the object in the plane perpendicular to the reference axis;
a first moving means for moving said optical contact detector means relative to the object along the reference axis; and
an auxiliary moving means for moving said optical contact detector means relative to said moving means along the reference axis.

23. A device for sensing as claimed in claim 22 wherein said optical contact detector means also detects the presence of the object in a reference plane including the reference axis, and wherein said first moving means and said auxiliary moving means further move said probe in said reference plane.

24. An apparatus for sensing presence or location as claimed in claim 23 wherein said auxiliary moving means moves said optical contact detector means in an oscillatory movement in the reference plane.

25. An apparatus for sensing presence or location as claimed in claims 23 or 24 wherein said optical contact detector means includes a contact ball capable of movement in the reference plane, a probe shaft, a light beam source located in said ball and movable therewith, an aperture located in said probe shaft through which said light beam is directed, and a detector array means upon which the light beam passing through said aperture forms a spot for detecting movement of the spot indicating movement of said ball caused by contact with the object.

26. An apparatus for sensing presence or location as claimed in claim 22 wherein said optical contact detector means includes a contact bar disposed along the reference axis and having one end extending away from said optical contact probe means and the other end positioned to interrrupt a light beam projected toward said other end, and a detector array means for detecting the other end of said contact bar to determine when the one end contacts the object.

27. An apparatus for sensing presence or location as claimed in claim 26 wherein said contact bar is resiliently biased in one direction along the reference axis.

28. An apparatus for sensing presence or location as claimed in claim 27 wherein said contact bar is resiliently biased toward the light beam and wherein said auxiliary moving means periodically moves said contact bar away from the light beam.

29. An apparatus for sensing presence or location as claimed in claim 28 wherein there are a plurality of resiliently mounted contacts bars equally spaced in a reference plane including the reference axis about the light beam.

30. An apparatus for sensing presence or location as claimed in claim 29 wherein said auxiliary moving means moves said contact bars sequentially.

31. An apparatus for sensing presence or location as claimed in claim 29 wherein said auxiliary moving means moves said contact bars simultaneously.

32. An apparatus for sensing presence or location as claimed in claims 30 or 31 wherein said auxiliary moving means is pneumatically operated.

33. A method for sensing the location of an object in a plane perpendicular to a reference axis comprising the steps of:
moving a probe device relative to the object along the reference axis until an optical detector associated with the probe device senses the approximate location of the object by use of triangulation techniques;
further moving the probe device relative to the object along the reference axis until a control detector associated with the probe device senses the precise location of the object by contacting the object.

34. A method for sensing location as claimed in claim 33 wherein the probe device is initially moved quickly until the approximate location of the object is sensed by the optical detector and thereafter the probe device is moved slowly until the precise location of the object is sensed by the contact detector.

35. A method for sensing location as claimed in claim 34 wherein the location of the object is sensed in a reference plane including the reference axis and the probe device is additionally moved in the reference plane in a direction perpendicular to the reference axis as the optical detector senses the approximate location of the object and as the contact device senses the precise location of the object.

36. A method for sensing location as claimed in claims 34 or 35 wherein the probe device is moved quickly by a first moving device and is moved slowly by a second moving device attached to the first moving device.

37. A method for sensing location as claimed in claim 36 wherein the second moving device moves the contact device reciprocally and the second moving device is periodically actuated.

38. A method for sensing location as claimed in claim 33 wherein the optical detector projects a plurality of light beams whereby the attitude of the surface of the object is also determined.

* * * * *